(12) United States Patent
Artru et al.

(10) Patent No.: US 11,780,420 B2
(45) Date of Patent: Oct. 10, 2023

(54) MODULAR HYDRAULIC BRAKING SYSTEM AND A METHOD FOR DATA TRANSMISSION FOR A RAIL VEHICLE (71) Applicant: KNORR-BREMSE SYSTEME FÜR SCHIENENFAHRZEUGE GMBH, Munich (DE)

(72) Inventors: Philippe Artru, Munich (DE); Marcus Clev, Munich (DE); Klaus Oberpichler, Munich (DE); Andreas Fuchs, Gertshofen (DE)

(73) Assignee: KNORR-BREMSE SYSTEME FÜR SCHIENENFAHRZEUGE GMBH

( * ) Notice: Subject to any disclaimer, the term of this patent is extended or adjusted under 35 U.S.C. 154(b) by 98 days.

(21) Appl. No.: 16/314,273

(22) PCT Filed: Jun. 14, 2017

(86) PCT No.: PCT/EP2017/064473
§ 371 (c)(1),
(2) Date: Dec. 28, 2018

(87) PCT Pub. No.: WO2018/001725
PCT Pub. Date: Jan. 4, 2018

(65) Prior Publication Data
US 2019/0256073 A1 Aug. 22, 2019

(30) Foreign Application Priority Data

Jun. 28, 2016 (DE) .......................... 102016111763.3

(51) Int. Cl.
*B60T 17/22* (2006.01)
*B60T 13/66* (2006.01)

(52) U.S. Cl.
CPC .......... *B60T 17/228* (2013.01); *B60T 13/665* (2013.01)

(58) Field of Classification Search
CPC ........ B60T 17/22; B60T 17/228; B60T 13/66; B60T 13/665
See application file for complete search history.

(56) References Cited

U.S. PATENT DOCUMENTS 3,523,545 A * 8/1970 Sampson .................. F15C 1/04
137/82
4,835,693 A * 5/1989 Smith .................. B60T 13/662
246/182 B
(Continued)

FOREIGN PATENT DOCUMENTS

CN  102548817 A  7/2012
CN  104955692 A  9/2015
(Continued)

OTHER PUBLICATIONS

International Search Report and Written Opinion for International Patent Application No. PCT/EP2017/064473; dated Oct. 27, 2017.

*Primary Examiner* — Melody M Burch
(74) *Attorney, Agent, or Firm* — Barnes & Thornburg LLP (57) ABSTRACT A modular hydraulic braking system for a rail vehicle includes a medium that transmits to an electronic unit of a vehicle. The braking system includes at least one functional module, and one universal interface for transmitting control data via a signal channel, to the transmission medium between the at least one functional module and the vehicle electronic unit.

15 Claims, 6 Drawing Sheets (56) References Cited

U.S. PATENT DOCUMENTS

| | | | | |
|---|---|---|---|---|
| 5,887,953 A | * | 3/1999 | Wood | B60T 8/1893 |
| | | | | 303/15 |
| 9,994,241 B2 | | 6/2018 | Fischer | |
| 2005/0006948 A1 | | 1/2005 | Friesen | |
| 2012/0317282 A1 | * | 12/2012 | Kraeling | H04L 12/40 |
| | | | | 709/224 |
| 2013/0181513 A1 | * | 7/2013 | Yano | B60L 50/62 |
| | | | | 307/10.1 |
| 2013/0225090 A1 | * | 8/2013 | Yi | H04B 17/318 |
| | | | | 455/63.4 |
| 2014/0265544 A1 | * | 9/2014 | Ganzel | B60T 8/4081 |
| | | | | 303/6.01 |
| 2015/0367826 A1 | * | 12/2015 | Bildstein | B60T 13/588 |
| | | | | 303/10 |
| 2016/0107631 A1 | * | 4/2016 | Wallace | B60T 13/665 |
| | | | | 188/1.11 E |
| 2018/0170412 A1 | | 6/2018 | Fischer | |

FOREIGN PATENT DOCUMENTS

| | | | | |
|---|---|---|---|---|
| DE | 3205846 A1 | 8/1983 | | |
| DE | 19848990 A1 | 4/2000 | | |
| DE | 102009042965 A1 | 3/2011 | | |
| DE | 102010005938 A1 | 7/2011 | | |
| DE | 102013201623 A1 | 7/2014 | | |
| DE | 102014214228 A1 | 1/2016 | | |
| DE | 102014119101 A1 | 6/2016 | | |
| DE | 102015211587 A1 | 12/2016 | | |
| EP | 2927086 A1 | 10/2015 | | |
| FR | 2521508 A1 | 8/1983 | | |
| WO | 0249897 A1 | 6/2002 | | |
| WO | WO-2014117968 A1 | * | 8/2014 | B60T 13/665 |

\* cited by examiner

MODULAR HYDRAULIC BRAKING SYSTEM AND A METHOD FOR DATA TRANSMISSION FOR A RAIL VEHICLE

CROSS REFERENCE AND PRIORITY CLAIM

This patent application is a U.S. National Phase of International Patent Application No. PCT/EP2017/064473, filed Jun. 14, 2017, which claims priority to German Patent Application No. 10 2016 111 763.3 filed Jun. 28, 2016, the disclosures of which are incorporated herein by reference in their entirety.

FIELD

Disclosed embodiments relate to a modular hydraulic brake system or at least to an electro-hydraulic brake component, to a method for transmitting data for a rail vehicle and, in particular, to a communication interface between a vehicle electronics system of a rail vehicle and a subsystem of a brake installation.

BACKGROUND

In presently customary architectures for electro-hydraulic brake systems in rail vehicles, inter alia the following basic components are used: at least one brake control unit, at least one hydraulic unit with, if appropriate, a connected hydraulic accumulator, a plurality of brake calipers with brake linings and brake disks. The brake system can be expanded functionally by an anti-skid means with its pulse encoders and the load acquisition with its load sensors. A (central) vehicle controller controls the electro-hydraulic brake via at least one brake control unit.

SUMMARY

Disclosed embodiments relate to a modular hydraulic brake system for a rail vehicle which has a transmission medium for transmitting to a vehicle electronic system (e.g., a vehicle controller or a brake controller). The modular hydraulic brake system comprises at least one function module and one universal interface for transmitting control data on a signal channel of the transmission medium between the function module and the vehicle electronics system.

BRIEF DESCRIPTION OF THE FIGURES

The disclosed embodiments will be understood better with the following detailed description and the appended drawings of the different disclosed embodiments, which, however, should not be understood as meaning that it restricts the disclosure to the specific disclosed embodiments, but rather serve to explain and to promote understanding.

DETAILED DESCRIPTION

The term "brake system" is to be interpreted in a wide fashion within the scope of the disclosed embodiments and should not necessarily comprise all the components which are necessary for braking a vehicle. Therefore, the brake system is also to refer to individual components which perform a specific functionality within the entire brake system. The "function module" is to refer to any component which performs a specific function in the brake system. The term "transmission medium" is to be interpreted in a wide fashion and is to comprise all the means which can be used to transmit information with all types of data transmission. The control data are all data which are suitable for controlling and/or monitoring the function module and/or for acquiring a present status or state of the function module (including sensor data).

The term "universal" is to be interpreted as meaning that the relevant interface or a corresponding bus can be used for any desired function modules (e.g., for various hydraulic units, sensor modules, anti-skid modules, etc.) and is not specific to a given function module. This permits the data transmission between the individual function modules and the vehicle electronics system to be made uniform. For example, the universal interface can be a uniform, standardized interface.

Figure 6:
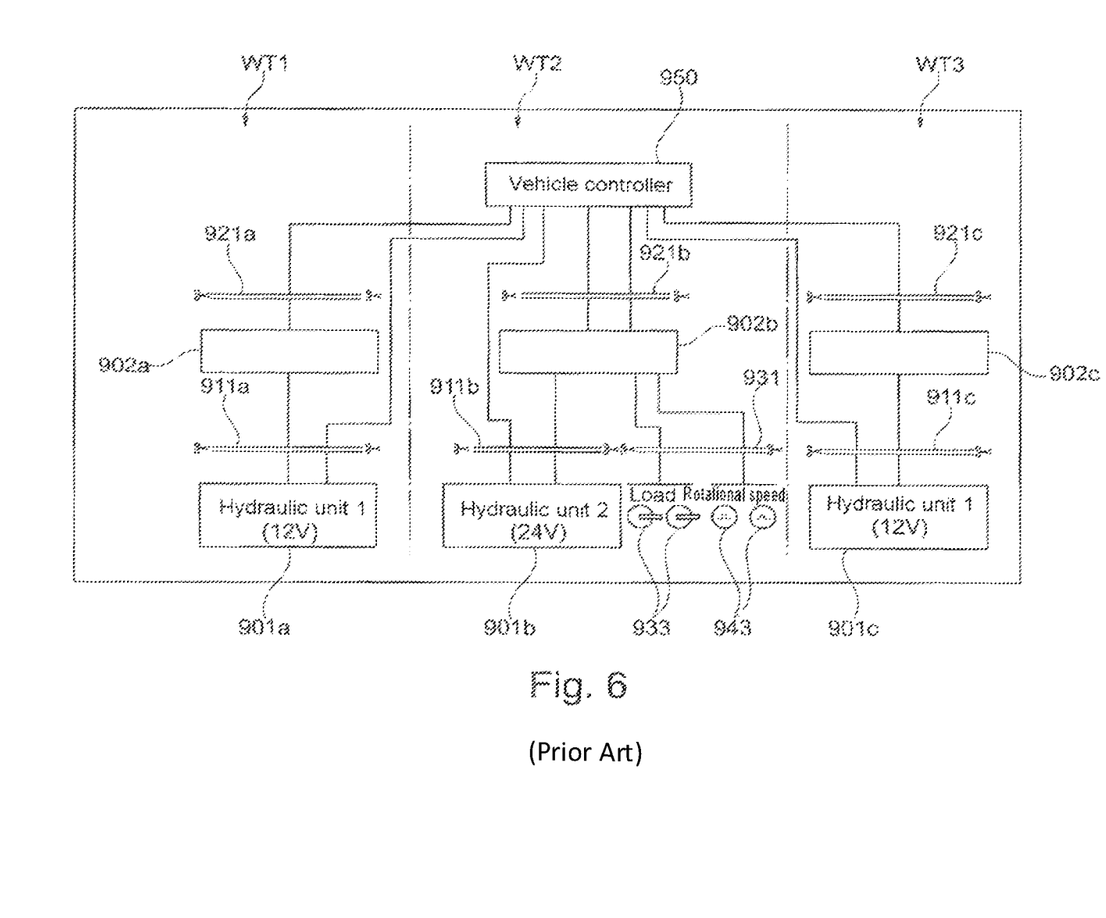
FIG. 6 shows a conventional control concept.

The universal interface and the function module can, but do not need to, be embodied as one unit (e.g., in a common housing). Instead, the universal interface can also be embodied as a circuit block, to which a plurality of function modules for various functions in the rail vehicle can be connected, in order thereby to permit a modular expansion just one interface. Therefore, the signal channel can be, in particular, a databus which can address various function modules, for example, address assignments, with the result that control data which are transmitted to the brake system component by the vehicle controller or the brake controller can be assigned or are transmitted thereto by the universal interface to various function modules. FIG. 6 shows a conventional control concept of an disclosed three-part vehicle with a first vehicle part WT1, a second vehicle part WT2 and a third vehicle part WT3. For example, the first vehicle part WT1 comprises a first hydraulic unit 901a and a first brake control unit 902a which are connected to one another via a first interface 911a. The first brake control unit 902a is also connected to the vehicle controller 950 via a second interface 921a. The first hydraulic unit 901a can also be connected directly to the vehicle controller 950 via the first interface 911a.

The second vehicle part WT2 is constructed in the same way. Thus, the second vehicle part WT2 comprises a second hydraulic unit 901b and a second brake control unit 902b which are connected to one another via a third interface 911b. The second brake control unit 902b is connected to the vehicle controller 950 via a fourth interface 921b, and the second hydraulic unit 901b is also likewise connected directly to the vehicle controller 950 via the third interface 911b. Furthermore, the second brake control unit 902b is connected to at least one load sensor 933 and at least one rotational speed sensor 943 via a fifth interface 931.

The third vehicle part WT3 is constructed in the same way, the vehicle part WT3 having a third hydraulic unit 901c and a third brake control unit 902c, which are in turn connected to one another via a sixth interface 911c. The third brake control unit 902c is connected to the vehicle controller 950 via a seventh interface 921c. Finally, the third hydraulic unit 901c is also connected directly to the vehicle controller 950 via the sixth interface 911c.

In the system, to a certain extent different brake control units 902 are therefore used in different car parts of the rail vehicle. The interfaces 921 from the vehicle controller 950 to the brake controllers 902 are not uniform and are generally product-dependent as a result of hard-wired signals. The hydraulic units 901 differ, for example, in terms of the rated voltage of a number of main components and are therefore not embodied in a uniform fashion. In particular, in addition to the interfaces 921 of the vehicle controller 950 to the brake controller 902, there are further interfaces 911 from the vehicle controller directly to the hydraulic units 901. The actuated components also operate frequently with different voltages, wherein the following direct voltages can be used: 12 V, 24 V, 36 V, 37.5, 72 V or 110 V. Furthermore, there are also further interfaces 931 which require a configuration of the corresponding brake control unit 902.

This gives rise to non-uniform, project-dependent and voltage-dependent interfaces 911, 921, 931 which makes it impossible to make the underlying functional level uniform owing to the resulting large number of variants. Furthermore, the adaptation of units to other supply voltages repeatedly causes problems with respect to the selection and availability of suitable components.

Generally, the components shown have previously been activated by hard-wired control lines. This type of actiration in the vehicle entails a series of limitations. Thus, owing to the spatial arrangement of the components in the vehicle there is a considerable expenditure on wiring. For example, the vehicle controller 950 and the brake controller 902 are generally accommodated in a roof area of the vehicle, while the brake system components are typically located in a vehicle underbody.

Different functional requirements also require different interfaces, in particular in the field of brake control units 902 and hydraulic units 901. Functional expansions or changes therefore require costly changes to the wiring. The hardwired interfaces 911, 921 are, as stated, voltage-dependent and the interface to the electro-hydraulic brake system is function-dependent. Additional data, such as are customary in modern architectures, cannot be acquired and communicated, since the transmission path is missing owing to the hard wiring. In particular, detailed diagnostic information cannot be transmitted to the vehicle controller 950 from all the bogie equipment or running gear equipment.

Therefore, there is a need for brake system components which do not have the abovementioned disadvantages or limitations.

In disclosed embodiments, the at least one function module can be coupled to at least one actuator and/or to at least one sensor, and the at least one function module comprises a control device and/or a module communication interface. The control device and/or the module communication interface are/is designed to make available at least one of the following functions: to make available control signals for the actuator and/or to acquire sensor data, to identify unambiguously the at least one function module and/or the actuator and/or the sensor, to assign functions to the at least one function module and/or to the actuator and/or the sensor or to change assigned functions, and to determine loading of a function module and/or of an additional module and/or of the actuator and/or of the sensor and to make available a result. Said assigned functions may comprise, for example, acquiring and making available specific sensor data, e.g., making available the sensor data to other function modules. The sensor data could in principle be acquired by various function modules, the making available of which makes it possible to avoid double acquisition.

In further disclosed embodiments, the modular hydraulic brake system comprises a control module which does not have to be part of a function module. The control module can be accommodated, for example, in the universal interface. Furthermore, at least one function module can couple to an additional module which can be any desired component of the brake system which makes available a predetermined function. The control module can perform the same functions as the control device. Furthermore, the control module can be designed to make available at least one of the following functions: to detect an exchange of a function module or of an additional module, to assign functions to the at least one function module and/or to the actuator and/or to the sensor or to change the functions, to determine loading of a function module and/or of an additional module and/or of the actuator and/or of the sensor and to make available a result, to identify unambiguously the at least one function module and/or the actuator and/or the sensor and to make available corresponding information.

In further disclosed embodiments, the rail vehicle comprises a power supply line to a power supply source, and the universal interface makes available a power supply connection for the function module. In further disclosed embodiments, the universal interface is designed to transmit the control data via the power supply line.

In further disclosed embodiments, the brake system component comprises a further function module which is connected to the function module, and the universal interface is designed to pass on control data for the function module and for the further function module. The two function modules can be addressed, for example, in a digital fashion here. For example, one function module can function as a master unit, while the other function module functions as a slave unit or satellite unit which carries out data communication with the universal interface via the function module (master unit). Correspondingly, in further disclosed embodiments the universal interface can be designed to carry out a parallel data transmission for various function modules via the transmission medium.

Disclosed embodiments permit, in particular, all the control data and analysis data which are exchanged between the vehicle controller and the function module to be transmitted over just one signal channel or just one transmission medium. Therefore, there is no need for any additional hard wiring and/or it can merely be embodied in a redundant fashion in order to satisfy, for example, specific safety requirements. For example, the transmission medium can be a digital data bus system (universal bus), and the universal interface can be designed to carry out data transmission according to a multiplex method. The data transmission can be carried out here, in particular, in a function-independent fashion.

In further disclosed embodiments, the function module is designed to transmit all the data between the function module and the vehicle electronics system only via the transmission medium, using the universal interface.

In further disclosed embodiments, the universal interface can optionally couple to a hard wire line leading to the vehicle electronics system, in order to transmit safety-relevant data between the vehicle electronics system and the function module. The safety-relevant data relate, in particular, to data (commands) for initiating a safety brake and/or to signals which permit the emergency travel of the vehicle. However, the hard wiring is not necessarily required. For example, the universal interface can also ensure secure data transmission, wherein the secure data transmission satisfies a predefined security level (e.g., certain data are transmitted redundantly or a confirmation is made possible). In such a case, there is no need for a separate signal line to be embodied for safety-relevant functions.

In further disclosed embodiments, the function module comprises at least one of the following components: a hydraulic unit, a brake caliper, an anti-skid module, a sensor module, a braking medium energy conversion unit, an assistance triggering unit, a sanding device, a magnetic rail brake. Furthermore, the universal interface can be designed to pass on specific control data to various function modules.

In further disclosed embodiments, the transmission medium is wire-bound, wireless or glass-fiber-based.

Disclosed embodiments also relate to a system which can be expanded in a modular fashion and which has at least two (or at least one) of the brake system components mentioned above and a transmission medium which makes available at least one signal channel, in order to exchange control data between the at least two brake system components and the vehicle electronics system. The signal channel can couple, for example, to a multiplicity of components of the rail vehicle in order to form the system which can be expanded in a modular fashion. The system can optionally comprise a voltage supply which has a voltage transformer and is designed to make available a universal voltage supply for the at least two brake system components. Therefore, disclosed embodiments permit independent function modules which can be combined according to the requirements. In particular, as a result, various supply voltages which can be present in various vehicles can be used by virtue of the modular hydraulic brake system.

Disclosed embodiments also relate to a rail vehicle having a vehicle electronics system, at least one of the brake system components described above or one of the systems which can be expanded in a modular fashion described above and a transmission medium which makes available at least one signal channel in order to exchange control data between the vehicle electronics system and one or more function modules.

Disclosed embodiments also relate to a method for transmitting data on a transmission medium. The method comprises the following steps: transmitting control data between a universal interface and a vehicle electronics system, transmitting function module data between the universal interface and at least one function module, and converting the function module data into control data or the control data into function module data by a universal interface.

The specified sequence of steps does not imply any chronological order, or only in so far as is absolutely necessary.

Control data are to be understood to be all information which are to be transmitted to the function modules or are received therefrom. The function module data are hardware-specific data for activating, for example, actuators in the function modules or for reading out from sensors in order to therefore obtain, for example, the information which is conveyed by the control data.

Figure 1:
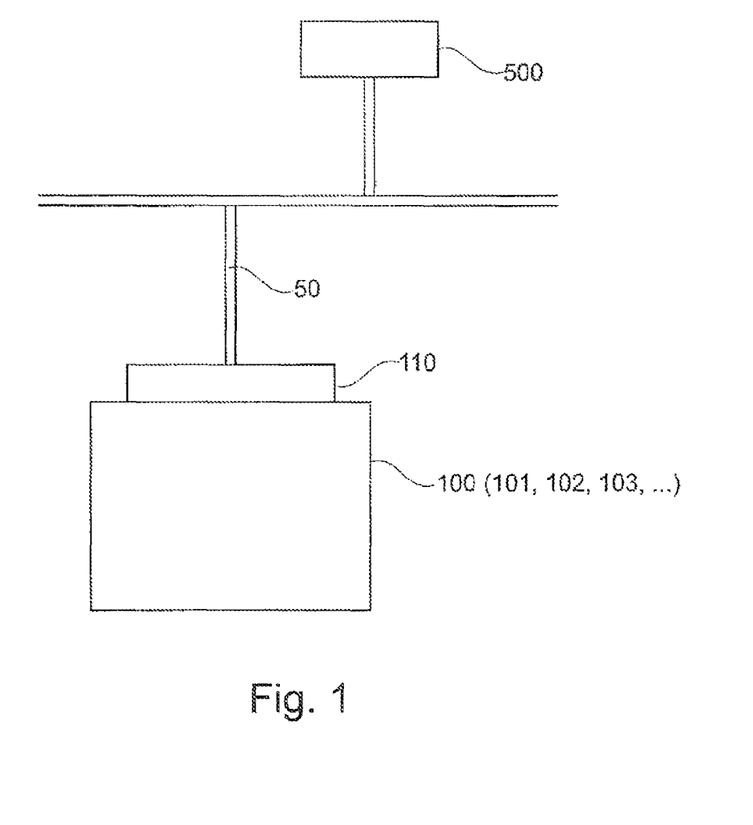
FIG. 1 shows an electro-hydraulic brake system component according to an disclosed embodiment.

FIG. 1 shows an electro-hydraulic brake system component as a simple disclosed embodiment of the modular hydraulic brake system according to the disclosed embodiments, which is suitable for a rail vehicle which has a transmission medium 50 for transmitting to a vehicle electronics system 500. The brake system component comprises at least one function module 100 and one universal interface 110 for transmitting control data via a signal channel on the transmission medium 50 between the function module 100 and the vehicle electronics system 500, wherein the vehicle electronics system can comprise, in particular, a vehicle controller and/or a brake controller.

The simplest modular hydraulic brake system which is shown can be expanded in a modular fashion without the universal interface 110 (i.e. a general communication interface) to the vehicle having to be changed. For this purpose, the brake system can use as a transmission medium 50 a universal bus (which can be wire-connected or also wireless), which permits a connection of the universal interface 110 of the modular hydraulic brake system to a brake controller or a vehicle controller. This universal bus 50 can be, for example, a bus which is already present (e.g., a CAN bus) or a new, independent bus.

Figure 2:
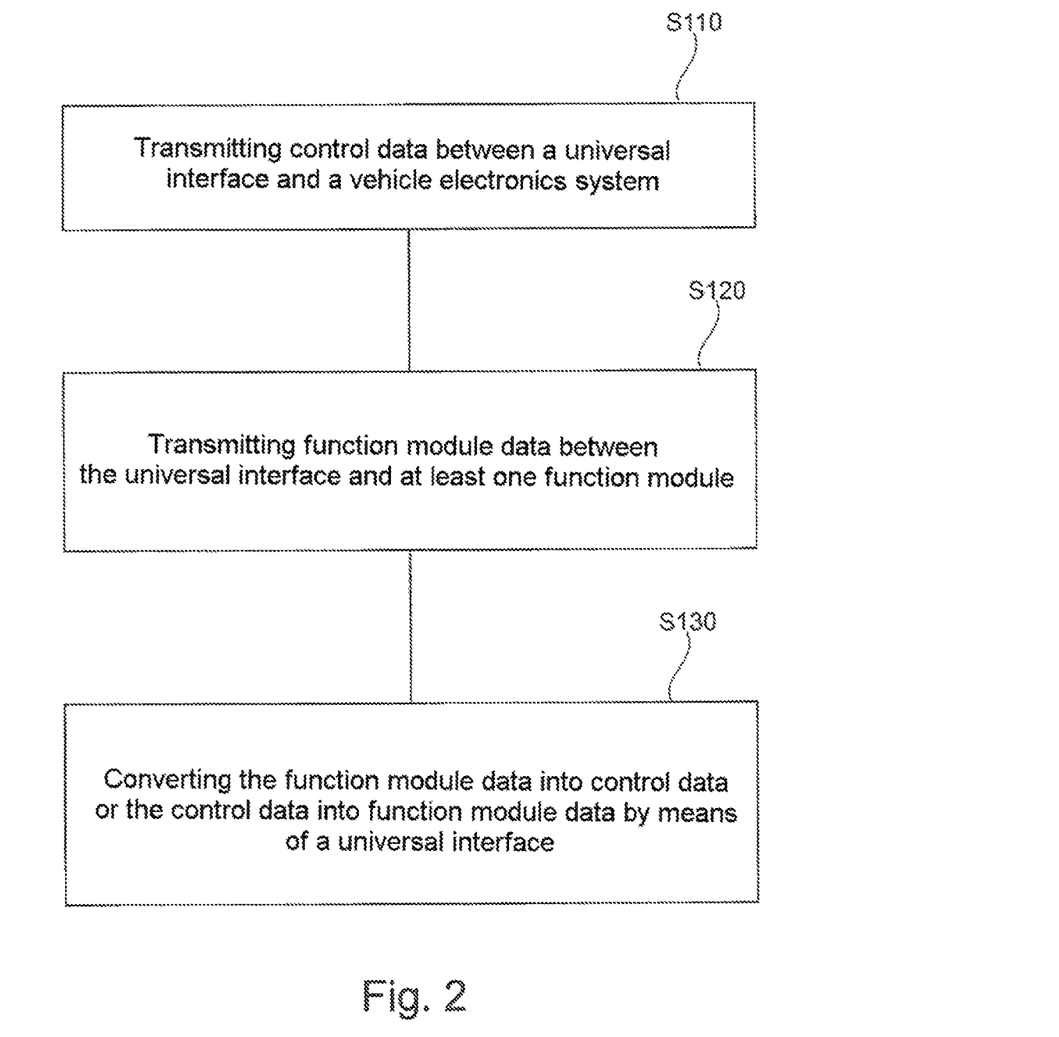
FIG. 2 shows a flowchart of a method for transmitting data according to disclosed embodiments.

FIG. 2 shows a flowchart of a method for transmitting data on a transmission medium, wherein the method can be implemented in the modular hydraulic brake system. The method comprises: transmitting S110 control data between the universal interface 110 and the vehicle electronics system 500, transmitting S120 function module data between the universal interface 110 and the at least one function module 100, and converting S130 the function module data into control data or the control data into function module data by a universal interface 110. Furthermore, data can be transmitted to the vehicle electronics system 500 via a back channel and be used, for example, for status interrogations or for diagnostics.

Figure 3:
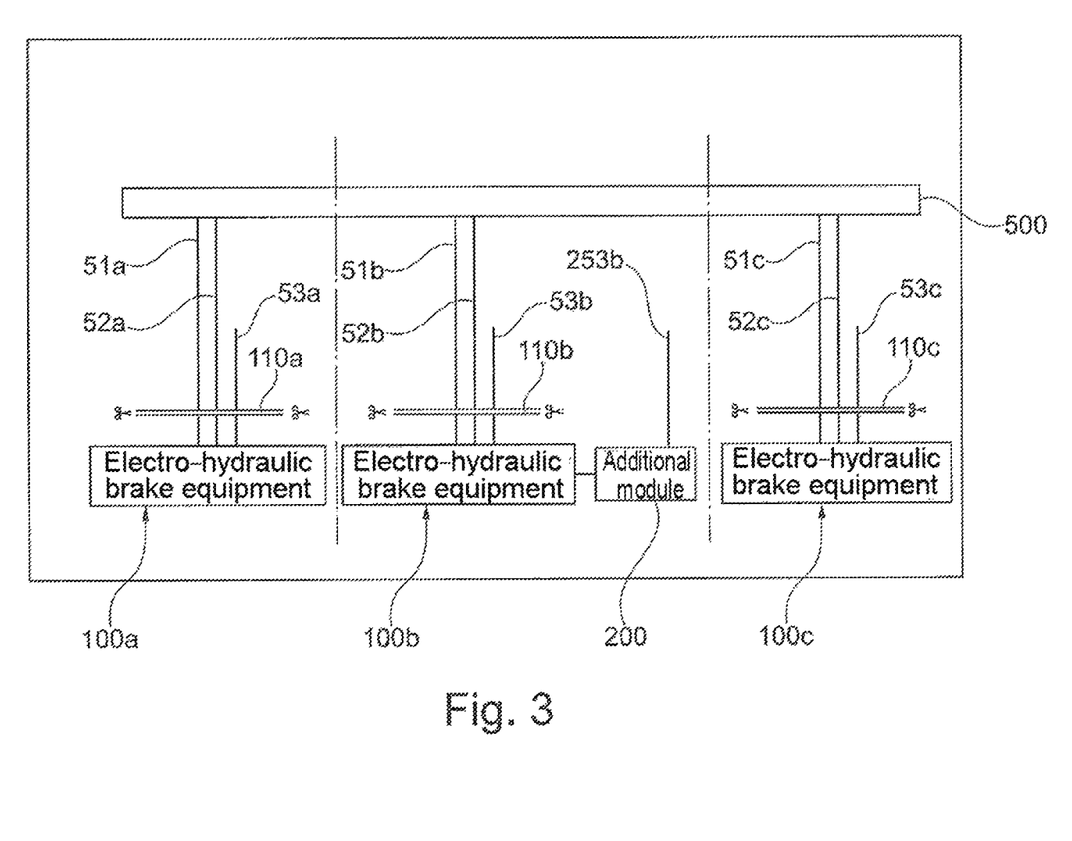
FIG. 3 shows a modular hydraulic brake system according to disclosed embodiments.

FIG. 3 shows the modular hydraulic brake system which uses the universal interface 110 according to disclosed embodiments. In the disclosed embodiment shown, there is a first function module 100a, a second function module 100b and a third function module 100c, which are each connected to a brake controller or vehicle controller 500 via a universal interface 110a, 110b, 110c. The individual function modules 100a, 100b, 100c can be any desired electro-hydraulic brake equipment and be located on various vehicle axles or in various vehicle parts or in vehicles which are connected to one another and are activated jointly by a vehicle controller or brake controller 500.

In the disclosed embodiment shown, this connection is implemented by respective hard-wired lines 52a, 52b, 52c and respective bus lines or control lines 51a, 51b, 51c. Moreover, the function modules 100a, 100b, 100c are each connected to an energy supply (not shown) via energy supply lines 53a, 53b, 53c and are supplied with energy from the energy supply. The universal interfaces 110a, 110b, 110c can be embodied in the same way for all the function modules 100a, 100b, 100c. As a result it becomes possible to be able to expand the brake system in a flexible way by further modules. For example, the second function module 100b couples to an optional additional module 200 which can provide, for example, an additional sensor system. The additional module 200 can be connected directly to the energy supply via a supply line 253b. The modularization which is shown is achieved by the universal interface 110 which can be uniform, flexible and project-independent and voltage-independent and can have corresponding connections for all the lines 51, 52, 53.

Figure 4:
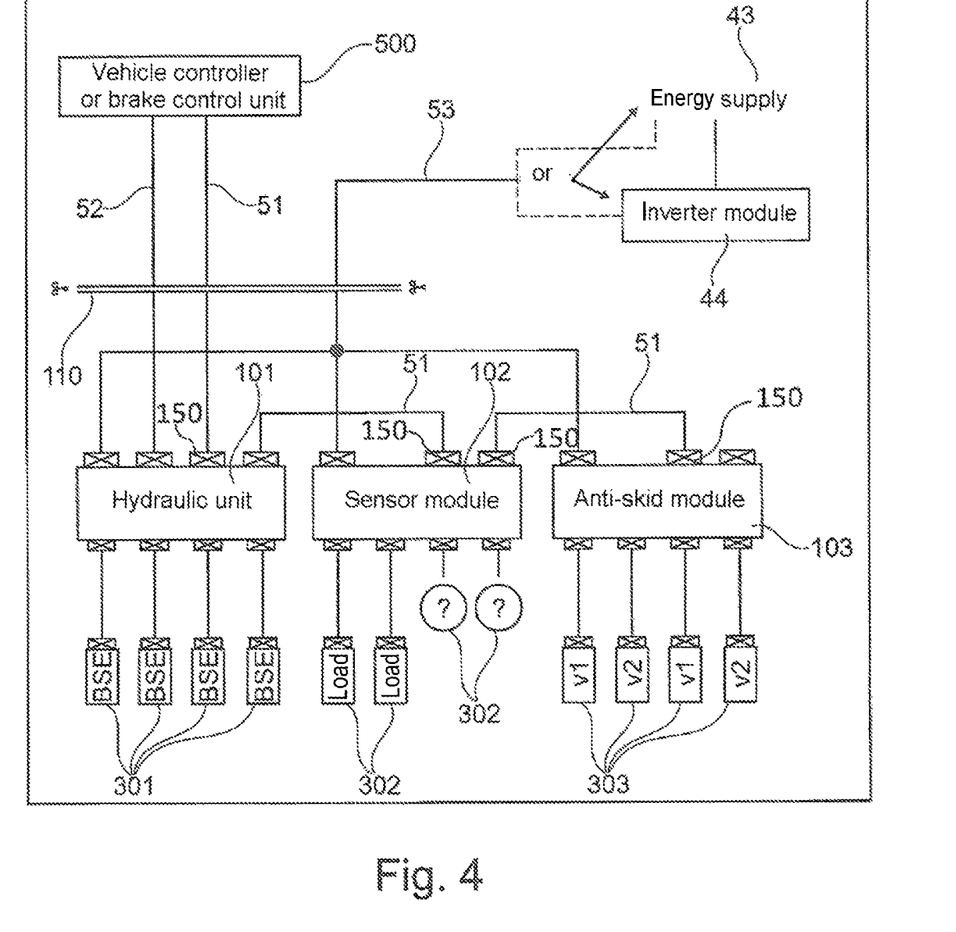
FIG. 4 shows a further disclosed embodiment of the modular design of bogie equipment or running gear equipment.

FIG. 4 shows a further disclosed embodiment of the modular design of bogie equipment or running gear equipment. The function modules 100 in FIG. 4 comprise, for example, a hydraulic unit 101, a sensor module 102 and an anti-skid module 103, which are optionally connected to an inverter module 44 or a central energy supply 43 via an energy supply line 53, in order to be supplied with energy from the energy supply 43. The inverter module 44 is designed, for example, to adapt the energy supply (e.g., to adapt the electrical voltage) to the requirements of the individual function modules 101, 102, 103.

Moreover, the function modules 101, 102, 103 are connected to the vehicle controller or to the brake control unit 500 via control lines 51 as an example of the transmission medium. These control lines 51 can be embodied, for example, as bus lines as part of a digital bus system as optical signal connections via which digital data are transmitted. Therefore, the function modules 101, 102, 103 do not have to be connected individually to the vehicle controller 500. Instead it is sufficient that, for example, the hydraulic unit 101 is connected to the vehicle controller or to the vehicle control unit 500. All the further function modules 102, 103 can each be connected to the hydraulic unit 101, which passes on the data from and to the exemplary sensor module 102 and from and to the exemplary anti-skid module 103.

Moreover, an optional hard wiring 52 is embodied as a connection between the vehicle controller or the brake control unit 500 and the hydraulic unit 101. This hard wiring 52 can also run through the universal interface 110. The universal interface 110 can for this purpose have a corresponding port for passing through the corresponding signals. It therefore becomes possible for safety-relevant signals to be transmitted redundantly from and to the hydraulic unit 101. Furthermore, further signals, which serve to provide a high level of availability of individual functions (such as, for example, signals which permit emergency travel of the vehicle) can be transmitted via the universal interface 110. The hydraulic unit 101 can be connected to a brake caliper electronics system (BSE) 301. Likewise, the sensor module 102 can be connected to various load sensors 302. The anti-skid module 103 can be connected, for example, to a multiplicity of pulse encoders or rotational speed sensors 303.

For example, the vehicle control unit or the brake control unit 500 (vehicle electronics system) is embodied as an independent control unit in a roof area of rail vehicles, and the function modules 100 (e.g., a hydraulic unit 101, a sensor module 102 or an anti-skid module 103) are embodied in a lower car body or in the vicinity of the chassis and bogie in the vicinity of the brake caliper 301 or of the load sensors 302 or of the pulse encoders 303.

The hydraulic unit 101 which is shown in FIG. 4 can therefore optionally be used as a master component, to which one or more further function modules can be coupled as satellite systems (slaves) 102, 103, with the result that the system can be expanded in a flexible way. The communication with the vehicle controller or with the brake controller 500 can therefore take place via the existing hydraulic unit 101, as a master unit. The data transmission can for this purpose use, for example, an addressing process in order to identify the transmitter or the addressee of the data to be transmitted. The same applies to the power supply. It is also possible here for the universal interface 110 to be embodied only once, and for all the further function modules to be supplied both with control data and with a supply voltage via the one universal interface. Therefore, each function module 100 within the system can be identified individually via the universal interface 110 of the modular hydraulic brake system. For this purpose, for example, an identifier (ID) or address can be allocated which is assigned to each function module 100 and each additional module and permits an unambiguous identification.

In contrast to the disclosed embodiment shown in FIG. 4, in the disclosed embodiment in FIG. 3 each piece of brake equipment (hydraulic unit, sensor module, anti-skid module, etc.) comprises a dedicated universal interface 110.

The individual function modules can have the following components:

The hydraulic unit 101 comprises, for example, an electronic circuit board with a CPU and functional modules which can be embodied as a control device, an input/output for the bus, a hard wiring input/output, a program accumulator, a parameter accumulator, an internal power supply, a voltage sensor and interfaces for additional modules, pressure sensors, valves, motors and switches.

The sensor module 102 comprises, for example, a CPU which can be embodied as a control device, an input/output for the bus, a program accumulator, a parameter memory, an internal power supply, and is provided, for example, in a suitable housing for the installation in the lower car body and comprises, for example, interfaces for sensors. The sensor module 102 detects, for example, faults in connected sensors, such as, for example, cable breakages, short circuits, exceeding of ranges, configuration faults and dedicated internal faults and outputs corresponding diagnostic messages via its bus communication point.

The anti-skid module 103 is provided, for example, in a suitable housing for the installation in the lower car body and comprises, for example, the following interfaces: a pulse encoder, bus communication interfaces, a power supply and software modules. The anti-skid module 103 can also have a control device and reads out cyclically all the required signals of the connected vehicle controller or brake controller 500 via the bus communication interface, and reads in the frequencies of the connected pulse encoders 302. The anti-skid module 103 calculates an anti-skid reduction value from these data and passes on the value via the communication bus to the pressure regulator which is located in the hydraulic unit 101. In addition, the vehicle receives information about the anti-skid status.

The function modules 100 in the disclosed embodiment in FIG. 4 have, for example, dedicated module communication interfaces 150 and each have a control device (not shown). The module communication interfaces 150 are designed, for example, to receive control data via the bus line 51 and to convey them to the control device, in order to activate the corresponding function module 101, 102, 103 and/or the actuators/sensors of the individual function module. The module communication interfaces 150 can optionally also directly activate actuators or sensors which are present.

The respective control device can form open-loop and closed-loop control functions and makes available, via the universal interface 110, the signals, which are necessary for the open-loop and closed-loop control, and also the supply voltage. For this purpose, a single bus for activation is sufficient and the activation signals can be conveyed to the modular hydraulic brake system via the bus independently of the voltage. The actuators/sensors 301, 302, 303 which are connected to the brake system can therefore be activated via the universal interface 110 autonomously and independently of the voltage. For this purpose, for example the data lines 51 can be used, wherein the power can be supplied independently of the activation (and therefore in a function-independent fashion) via the supply line 53.

The respective control device can also acquire the loading of the individual function module 100 or additional module 200 and can determine wear or a utilization rate, in order thereby to indicate necessary maintenance. Therefore, the function modules 100 act autonomously and independently of a central controller and can be flexibly added to the system and removed therefrom, wherein monitoring as to which degree a function module 100 has already been loaded in the past is constantly possible.

Apart from the respective control devices of the function modules, the modular hydraulic brake system can also comprise a control module. By using this control module and/or the universal interface 110 it is possible to determine an existing configuration (i.e. which function modules and additional modules are installed). In further disclosed embodiments, all the existing function modules 100 and optional additional modules 200 sign on to the control module. It therefore becomes possible for, for example, the vehicle electronics system to be able to selectively interrogate the configuration of the modular hydraulic brake system, and it to know precisely which modules are present. At the same time, as a result it becomes possible to detect an exchange of function modules 100 via the universal interface 110 of the modular hydraulic brake system, since the corresponding function modules 100 or additional modules 200 sign on and off at the universal interface 110 or at the existing control module (e.g., when they are replaced). The control module can be, for example, part of the universal interface 110, but does not have to be.

According to disclosed embodiments, the function modules 101, 102, 103 can be included in a modular fashion in the system, with the result that the system can be expanded by adding further function units without additional wiring expenditure. The function modules receive an identifier, wherein the identifier, as well as also diagnostic data, state data, load data, parameter data and/or configuration data and additional data can be interrogated, communicated and stored via the universal interface 110 during the operation of the vehicle. This can be used, for example, for servicing, maintenance, repair and reconditioning.

The modular hydraulic brake system can therefore be expanded functionally without the universal interface 110 needing to be changed. Instead, any desired number of function modules 100 can be connected to the one bus 50 (see FIG. 1), which function modules 100 are supplied with control signals via the one bus 50.

In further disclosed embodiments, the functions of the individual function modules 100 (e.g., the sensor system) can be freely apportioned without this having effects on the universal interface 110. For example, the anti-skid module 103 can itself acquire a rotational speed or use other existing sensors 303 for that purpose. Therefore, the functions can be acquired and processed independently of location (e.g., by the control device and/or by the control module).

The module communication interface 150 permits each function module 100 and additional module 200 to be unambiguously identifiable. Moreover, the modular hydraulic brake system can identify excluded system modules. Via the universal interface 110 of the modular hydraulic brake system or via the dedicated communication interfaces 150 of the function modules 100 it is possible to acquire individually a load on the individual function modules and additional modules and to assign it to the corresponding modules. Therefore, it becomes possible, for example, to detect precisely which function module 100 was loaded to what extent in the past so that necessary maintenance and servicing operations can be performed selectively when a specific module has reached a specific degree of loading.

Furthermore, it therefore becomes possible to indicate to a user when a specific module (function module 100 or additional module 200) is to be exchanged or maintained. Via the dedicated communication interface 150 of the function modules 100 it is also possible to connect servicing units in order to acquire the load of the corresponding module. Therefore, the function modules 100 can themselves act autonomously, i.e. they can be added to the system, removed from it, analyzed separately and individually or else acquired centrally via the control module and their loading therein can be analyzed.

All the data of sensors which are located in the function modules 100 can therefore be basically made accessible to all the other function modules 100 and can be transmitted (or interrogated) via the interface 110. All the function modules 100 are configured here for only a supply voltage which is used advantageously the most frequently or for a standardized supply voltage. All the function modules 100 can have a supply voltage adaptation device which is designed to support a supply of power to other supply voltages. All the function modules 100 can support a software installation or a software update via the interface 100.

Moreover, the individual function modules 100 can also satisfy the following specific requirements. The hydraulic units 101 can have identical interfaces for activating their electro-hydraulic functions. All the hydraulic units 101 can use the same supply of power of their components and are autonomous in respect of the control of their pressure supply, wherein predefined setpoint values of the brake pressure can be set. The hydraulic units 101 receive control commands via the interface 110, which commands are suitable for implementing the necessary electro-hydraulic components.

Moreover, hydraulic units 101 can read in an anti-skid reduction value via the interface 110 and can take it into account in the pressure. Moreover, the hydraulic units 101 can perform self-diagnostics of their electro-hydraulic functions. The hydraulic units 101 optionally comprise an additional sensor system, and data of this additional sensor system can be communicated to the hydraulic unit 101 and/or interrogated from there, during the operation of the vehicle.

Figure 5:
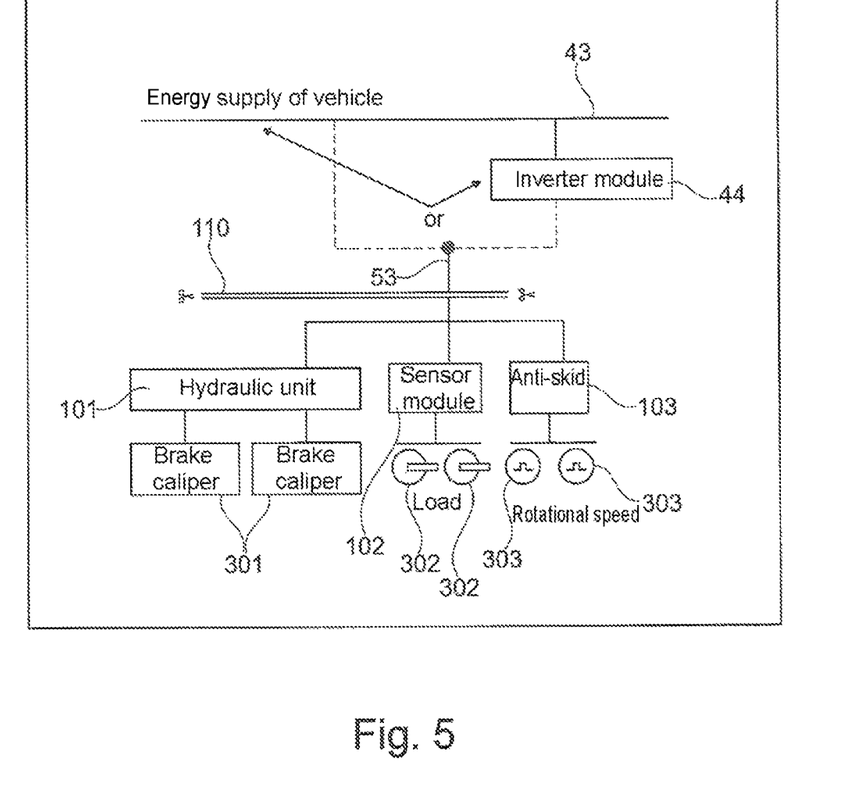
FIG. 5 illustrates a power supply for the individual function modules according to further disclosed embodiments.

FIG. 5 illustrates a power supply for the individual function modules 101, 102, 103. The power supply of the function modules is usually provided by the voltage supply 43 of the vehicle. All the function modules 101, 102, 103 can be correspondingly developed for the supply voltage which occurs most frequently or for a standardized supply voltage, with the result that they can be connected without additional measures. If the supply voltage of the vehicle should differ from the respective supply voltages of the modules, a inverter module 44 can be provided which carries out corresponding adaptation of the voltage values. The inverter module 44 can also be part of the brake system component which can be optionally accommodated in a common housing.

FIG. 5 shows by way of example as function modules 100 the hydraulic unit 101, the sensor module 102 and the anti-skid module 103, wherein the hydraulic unit 101 couples to the brake calipers 301, the sensor module 102 couples to at least one load sensor 302, and the anti-skid module 103 couples to at least one rotational speed measuring device 303. The hydraulic unit 101, the sensor module 102 and the anti-skid module 103 are connected via supply lines 53 via the interface 110 to the energy supply of the vehicle 43 or optionally to the inverter module 44, in order to obtain a corresponding supply voltage for the function modules 101, 102, 103.

It therefore becomes possible to make available a standardized supply voltage which can be used by all the function modules 100. The system can therefore be extended in a flexible way, since neither new data lines nor supply lines are necessary and/or only have to be connected via the universal interface 110.

The interface for the energy supply is configured to a standardized voltage value (for example 12 V or 24 V) and can be adapted to other supply voltages by additional inverter modules. Therefore, an adaptation to different vehicle voltages can be carried out using the voltage inverter 44 without the universal interface 110 to the modular hydraulic brake system having to be changed.

Disclosed embodiments offer the following technical utility:

Standardization is achieved by a uniform, flexible, project-independent and voltage-independent interface 110 to bogie equipment/running gear equipment (function modules 101, 102, 103). By a uniform voltage supply, the electrohydraulic unit components are standardized. Furthermore, cost-effective, prefabricated standard units can be used in a basic design. As a result, universal components can be used for the individual function modules such as, for example, the hydraulic unit 101, the sensor module 102 or the anti-skid module 103, which components can be prefabricated as standard units in basic units and therefore offer a considerable cost saving potential.

Further utility of disclosed embodiments includes the elimination of project-specific cabling and the use of standardized circuit diagrams, switching diagrams or software modules. In particular, through the use of the universal interface 110 it is possible to considerably reduce the wiring expenditure and modern additional services which use the universal interface, such as, for example, state-based maintenance, can be implemented. Finally, disclosed embodiments permit a uniform procedure for servicing and maintenance of the hydraulic units 101, since identical basic technologies can be used.

The sensor module 102 is freely configurable and can correspondingly be configured by inputting parameters. The sensor module 102 permits self-diagnostics and diagnostics of the connected sensors, wherein the diagnostic information can be output via the interface 110. The anti-skid module 103 permits the connection of a predefined number of pulse encoders 303. The anti-skid module 103 optionally receives the power supply of the connected pulse encoders 303. All the data from sensors which are connected to the anti-skid module 103 can be interrogated or communicated via the universal interface 110 of the anti-skid module 103. The anti-skid module 103 can also be correspondingly configured by inputting parameters. The anti-skid module 103 can also receive and evaluate anti-skid signals via its interface. The anti-skid module 103 can also calculate an anti-skid reduction value on the basis of the anti-skid signals received via its interface 110 and its pulse encoder signals and output the anti-skid reduction value via its interface 110. The anti-skid module 103 also permits self-diagnostics and diagnostics of the connected sensors and can output the diagnostic information via its interface.

The hydraulic unit can easily be expanded with additional functions by the described system architecture because the exchange of data can always run via the same identical interface.

Aspects of disclosed embodiments can also be summarized as follows:

A communication interface (universal interface 110) between the vehicle electronics system 500 of a rail vehicle and a subsystem 100 of a brake installation is not, as customary, to have one or more line sets for conventional electrical signals but rather is to transmit information by a signal channel 50. Therefore, this interface 110 only now contains one signal channel 50, one power supply line 53 and possibly also a small amount of cabling for safety-relevant functions such as, for example, a line for initiating safety braking.

The signal channel or the transmission medium can have one or more digital databus systems (such as, for example, a CAN bus). The signal channel can optionally constitute a radio solution. It is also possible for the signal channel 50 to transmit its data via a power supply line 53 (such as, for example, a PowerLAN).

In the case of disclosed embodiments, the cabling for safety-relevant functions can be dispensed with because the safety level of the data channel has the customary required and necessary security level of a rail vehicle.

The features of the disclosed embodiments which are disclosed in the description, the claims and the figures can be essential for the implementation of the disclosed embodiments both individually and in any desired combination.

LIST OF REFERENCE NUMBERS 43 energy supply
44 inverter module
50 transmission medium/signal channel
51 bus line
52 hard wiring
53 power supply connection
100 function module
101 hydraulic unit
102 sensor module
103 anti-skid module
110 universal interface
150 module communication interface
200 additional module
301 brake caliper units
302 load sensors
303 pulse encoder
500 vehicle electronics system (brake controller or vehicle controller)
911, 921, 931 conventional interfaces
901 conventional hydraulic units
950 vehicle controller
902 brake controller
933 load sensors
943 rotational speed sensors

The invention claimed is:

1. A modular hydraulic brake system for a rail vehicle, wherein the rail vehicle has a transmission medium for transmitting to a vehicle electronic system having a brake controller or a vehicle controller, the modular hydraulic brake system comprising:
at least one function module; and
one universal interface for transmitting control data, via a signal channel, on the transmission medium between the at least one function module and the vehicle electronics system,
wherein the at least one function module is directly coupled via a control line to an additional module which makes available a predetermined function, wherein the brake or vehicle controller communicates with the additional module via the at least one function module, wherein the universal interface is configured to interrogate information about the at least one function module and the additional module and to make the interrogated information available to the vehicle electronics system to permit a determination of a configuration, wherein each function module is individually identified within the system via the universal interface and an identification or address is assigned to each function module and each additional module, wherein the universal interface transmits control data for the at least one function module and for the additional module selectively using the assigned address or identification, wherein the universal interface provides a power supply connection for the at least one function module independently of control data, and wherein the at least one function module and the additional module are configured to sign on to and sign off from the universal interface, wherein the vehicle electronics system selectively interrogates the configuration of the modular hydraulic brake system, and determines which of the function and additional modules are present based on the sign on and sign off.

2. The modular hydraulic brake system of claim 1, wherein the at least one function module is couplable to an actuator and/or to a sensor, and wherein the at least one function module has a control device and/or a module communication interface designed to make available at least one of the following functions:

to make available control signals for the actuator and/or to acquire sensor data, to identify the at least one function module and/or the actuator and/or the sensor, to assign functions to the at least one function module and/or to the actuator and/or to the sensor or to change the functions, and to determine loading of a function module and/or of an additional module and/or of the actuator and/or of the sensor and to make available a result.

3. The modular hydraulic brake system of claim 1, wherein the at least one function module is couplable to an actuator and/or to a sensor and/or to an additional module, and the system further comprises a control module configured to make available at least one of the following functions:

to detect an exchange of the at least one function module or of the additional module to assign functions to the at least one function module and/or to the actuator and/or to the sensor or to change said functions, to determine loading of the at least one function module and/or of the additional module and/or of the actuator and/or of the sensor and to make available a result, and to identify the at least one function module and/or the actuator and/or the sensor and to make available corresponding information.

4. The modular hydraulic brake system of claim 1, further comprising a plurality of function modules including the at least one function module, wherein, within the plurality of function modules, a further function module is couplable to the at least one function module, wherein the universal interface is configured to pass on selectively control data for the at least one function module and for the further function module.

5. The modular hydraulic brake system of claim 1, wherein the rail vehicle has a power supply line to a power supply source, and wherein the universal interface makes available a power supply connection for the at least one function module independently of control data.

6. The modular hydraulic brake system of claim 5, wherein the universal interface is configured to transmit the control data via the power supply line.

7. The modular hydraulic brake system of claim 1, wherein the universal interface couplable to a hard wire line leading to the vehicle electronics system to transmit safety-relevant data between the vehicle electronics system and the at least one function module.

8. The modular hydraulic brake system of claim 1 further comprising a plurality of function modules including the at least one function module, wherein, the universal bus which connects the plurality of function modules function-independently, and wherein the plurality of function modules are configured to transmit all the data between the plurality of function modules and the vehicle electronics system only via the transmission medium using the universal interface and the universal bus.

9. The modular hydraulic brake system of claim 1, wherein the transmission medium is wire-bound or wireless or glass-fiber-based.

10. The modular hydraulic brake system of claim 1, wherein the universal interface is configured to carry out a parallel data transmission for various function modules via the transmission medium.

11. The modular hydraulic brake system of claim 1, further comprising a voltage transformer configured to make available a universal voltage supply for the at least one function module such that various supply voltages can be used without changing the universal interface.

12. The modular hydraulic brake system of claim 1, wherein the at least one function module has at least one of the following components: a hydraulic unit, a brake caliper, an anti-skid module, a sensor module, a braking medium energy conversion unit, an assistance triggering unit, a sanding device, a magnetic rail brake, and the universal interface is configured to pass on specific control data to the least one function modules.

13. A function module for a modular hydraulic brake system for a rail vehicle that has a transmission medium for transmitting to a vehicle electronic system having a brake controller or a vehicle controller, wherein the function module is part of the modular hydraulic brake system that also includes one universal interface for transmitting control data, via a signal channel, on the transmission medium between the function module and the vehicle electronics system, wherein the function module is controlled by the control data, wherein the function module is couplable to the universal interface to receive the control data from the vehicle electronics system and/or to exchange data with the vehicle electronics system, wherein the function module is directly coupled via a control line to an additional module which makes available a predetermined function, wherein the brake or vehicle controller communicates with the additional module via the at least one function module, wherein the function module is individually identified within the system via the universal interface and an identification or address is assigned to the function module and the additional module, wherein the universal interface transmits control data for the function module and for the further function module selectively using the assigned address or identification, wherein the universal interface provides a power supply connection for the function module independently of control data, and wherein the function module and the additional module are configured to sign on to and sign off from a universal interface, wherein the vehicle electronics system selectively interrogates the configuration of the modular hydraulic brake system, and determines which of the function and additional modules are present based on the sign on and sign off.

14. A rail vehicle comprising:

a vehicle electronics system including a brake controller or a vehicle controller;

a voltage supply; and a modular hydraulic brake system that has at least one function module, a transmission medium for transmitting to the vehicle electronics system, and one universal interface for transmitting control data, via a signal channel, on the transmission medium between the at least one function module and the vehicle electronics system, wherein the transmission medium makes available at least one signal channel to exchange the control data between the vehicle electronics system and the one or more function modules, wherein the at least one function module is directly coupled via a control line to an additional module which makes available a predetermined function, wherein the brake or vehicle controller communicates with the additional module via the at least one function module, wherein the universal interface is configured to interrogate information about the at least one function module and the additional module and to make the interrogated information available to the vehicle electronics system to permit a determination of a configuration, wherein the at least one function module is individually identified within the system via the universal interface and an identification or address is assigned to each function module and each additional module, wherein the universal interface transmits control data for the at least one function module and for the further function module selectively using the assigned address or identification, wherein the universal interface provides a power supply connection for the at least one function module independently of control data, and wherein the at least one function module and the additional module are configured to sign on to and sign off from the universal interface, wherein the vehicle electronics system selectively interrogates the configuration of the modular hydraulic brake system, and determines which of the function and additional modules are present based on the sign on and sign off.

15. A method for transmitting data on a transmission medium, the method comprising:

transmitting control data for a modular hydraulic brake system between a universal interface and a vehicle electronics system;

transmitting function module data between the universal interface and a function module and an additional module directly coupled via a control line to the function module, wherein the brake or vehicle controller communicates with the additional module via the at least one function module;

converting the function module data into control data or the control data into function module data by a universal interface;

individually identifying the at least one function module within the system via the universal interface and an identification or address is assigned to the function module, transmitting the control data by universal interface for the at least one function module selectively using the assigned address or identification, and providing a power supply connection for the function module via the universal interface independently of control data, wherein the vehicle electronics system selectively interrogates the configuration of the modular hydraulic brake system, and determines which of the function and additional modules are present based on the sign on and sign off.

* * * * *